Nov. 30, 1954     L. D. HAGENBOOK     2,695,701
TROUGHING ROLLER ASSEMBLY FOR BELT CONVEYERS
Filed Aug. 22, 1952     2 Sheets-Sheet 1
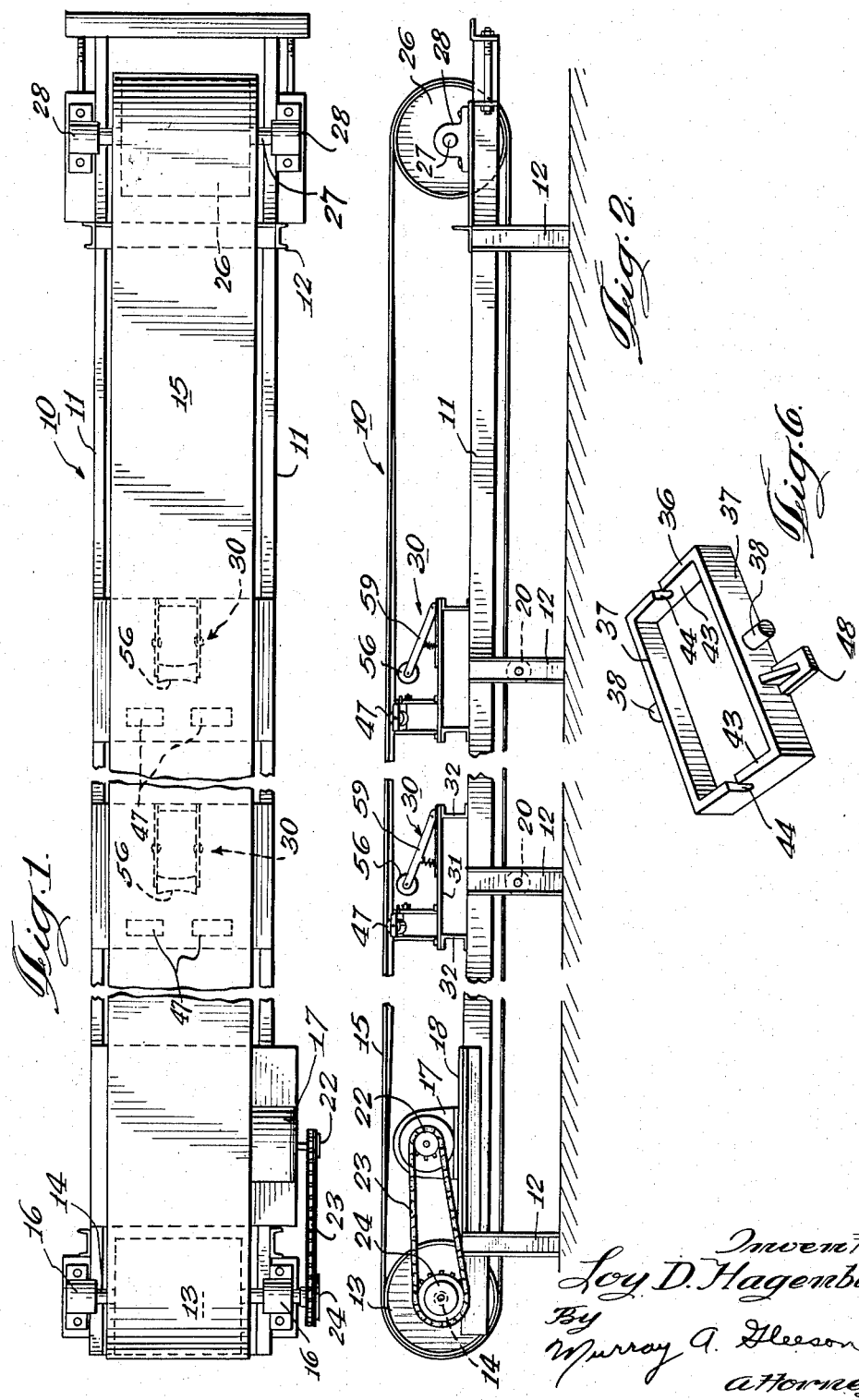

Nov. 30, 1954 L. D. HAGENBOOK 2,695,701
TROUGHING ROLLER ASSEMBLY FOR BELT CONVEYERS
Filed Aug. 22, 1952 2 Sheets-Sheet 2
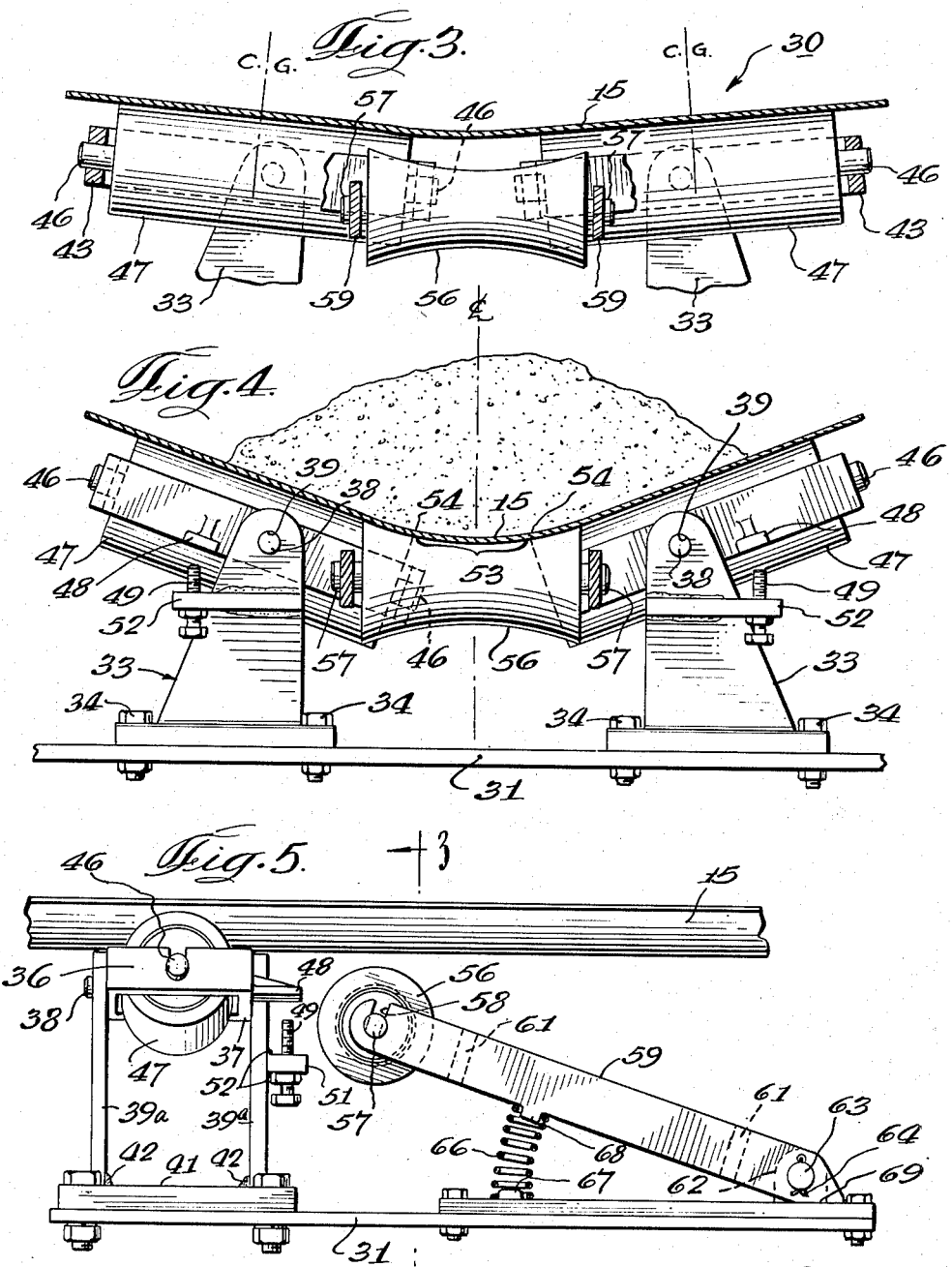
Inventor
Loy D. Hagenbook
By Murray G. Gleeson
attorney

United States Patent Office 2,695,701
Patented Nov. 30, 1954

2,695,701

TROUGHING ROLLER ASSEMBLY FOR BELT CONVEYERS

Loy D. Hagenbook, Chicago, Ill., assignor to Goodman Manufacturing Company, Chicago, Ill., a corporation of Illinois Application August 22, 1952, Serial No. 305,804

6 Claims. (Cl. 198—192)

This invention relates generally to endless belt conveyor systems and more particularly to a troughing roller assembly for steel belting for preventing undue stress concentration in the belt, particularly when it is heavily loaded.

In conveying systems employing steel belts it has been the practice to provide troughing rollers which adjust in their position according to the load on the belt. In such constructions, the belt is unsupported laterally for the distance between the inner ends of the troughing rollers, and the load over the unsupported length thereof creates conditions of concentrated or localized stress thereon at the inner ends of the troughing rollers. In such constructions the troughing rollers have generally been so arranged that during the unloaded or lightly loaded condition of the belt, the rollers do not aid in attempting to correct the belt contour, and so that at all times the belt tends to move in the troughing condition, with attendant conditions of localized stress described above.

In carrying out the invention the troughing rollers are arranged to correct an "overtroughing" condition of the belt during the unloaded or lightly loaded condition thereof, so that the belt will not sag too great an amount between the troughing rollers which would result in the stress condition described above. In the loaded condition of the belt, when the unsupported width thereof sags a rather large amount between the troughing rollers, a load supporting concave center roller contacts the underside of the belt to prevent the concentrated or localized stress therein.

With the foregoing considerations in mind it is a principal object of the invention to provide an improved troughing roller assembly for a belt conveyor, wherein the conveyor belt is characterized by absence of concentrated or local stresses occasioned by the loads thereon.

Other objects and important features of the invention will be apparent from a study of the following description taken with the drawings which together show a preferred embodiment of the invention and what is now considered to be the best mode of practicing the principles thereof. Other embodiments of the invention will be suggested to those having the benefit of the teachings herein and it is therefore intended that the scope of the invention not be limited by the precise embodiment herein shown, nor otherwise than by the scope of the subjoined claims.

In the drawings which illustrate the preferred embodiment of the invention:

Fig. 1 is a plan view of a belt conveyor having embodied therein the improved troughing roller assembly according to the present invention;

Fig. 2 is an elevation view thereof;

Fig. 3 is an end view, to a larger scale, of one of the troughing roller assemblies shown in Fig. 1, the belt conveyor in this view being in an unloaded or very lightly loaded condition;

Fig. 4 is a view similar to Fig. 3, but showing the belt in loaded condition with the load supporting center roller contacting the underside of the belt;

Fig. 5 is an elevation view of the troughing roller assembly shown in Fig. 3, the conveyor belt in this view being loaded correspondingly; and Fig. 6 is a perspective view of a cage supporting the troughing roller.

Referring now particularly to Figs. 1 and 2 of the drawings, the present invention is embodied in a belt conveyor indicated generally by the reference numeral 10. Such a conveyor may consist of longitudinal frame members 11 which are supported upon vertical standards 12. A conveyor belt 15 is trained around a driving roller 13 at the outby end of the conveyor 10. The pulley 13 is keyed to a shaft 14 journaled in bearing supports 16 mounted on the outside of each of the longitudinal frame members 11. A driving motor 17 for the driving roller 13 is mounted on a frame 18 spanning the frame members 11 and is positioned between the upper reach of the conveyor belt 15 and a lower return reach thereof. The motor 17 has a driving sprocket 22, and a driving chain 23 is trained therearound to drive a sprocket 24 made fast to the shaft 14.

The belt 15 is also trained around an idling roller 26 mounted at the inby end of the conveyor 10. The idling roller 26 turns with a shaft 27 mounted in bearing support 28 disposed on each side of the longitudinal frame members 11.

The lower or return reach of the belt 15 is supported on flat idler rollers 29 supported on the standards 12. The upper reach of the conveyor belt 15 must be supported throughout its length in such a fashion that the upper reach has a cross-section in the shape of a trough, the depth of the trough being in accordance with the loading on the upper reach. To this end the side frame members 11 form points of support for troughing roller assemblies indicated generally by the reference numeral 30. Such assemblies are preferably spaced an equal distance apart between the upper reach and the lower or return reach, so that the desired troughing contour of the upper reach may be maintained throughout the length thereof.

Each of the troughing roller assemblies 30 is mounted on a support plate 31 resting upon channel members 32 which span the distance between the spaced side frame members 11. U-shaped standards 33 are held to the mounting plate 31 by cap bolts 34, see Fig. 4, and are disposed an equal distance on each side of the center line of the upper reach of the belt 15. The U-shaped standard 33 provides a mounting for a substantially rectangular shaped cage 36, see Fig. 6. The cage 36 has side walls 37 and stub trunnion shafts 38 extending outward from the side walls 37 and through circular openings 39 in the standards 33, so that the cages 36 may swivel about the stub trunnion shafts 38. As seen more particularly in Fig. 5 the cage 36 may be made a part of a permanent assembly with the standards 33, by providing vertical legs 39 for the standards 33, and locating the vertical legs 39 on each side of the cage 36 and holding the legs 39 to a base 41 by weldments 42.

The cage 36 has end walls 43 which are slotted at 44 to receive idler shafts 46 of an idler troughing roller 47. The precise details of such a troughing roller form no part of the present invention, and may be of a structure so as to provide complete lubrication at all times while at the same time being sealed against the entrance of dust or other foreign matter.

As seen in Fig. 3, the upper reach of the conveyor belt 15 is shown as being in a lightly loaded or no load condition. The center of gravity C. G. of the idler roller 47 and its support cage 36 is always located at a point outside of the turning center of the stub shaft 38, so that a turning moment is provided tending to restore the upper reach to substantially a flat condition when the belt is in the unloaded condition. In order to limit the amount of movement of the troughing rollers 47 occasioned by the turning moment about the stub shaft 38, and in order to maintain the upper reach with a slight amount of trough as shown in Fig. 3, the cage 36 is provided with a stop arm 48, see Figs. 4 and 5, which engages an adjustable set screw 49 threaded into a lug 51 secured through one of the vertical legs 39 as at weldments 52.

The load upon the upper reach as seen in Fig. 4, causes the troughing rollers 47 to take the position as shown. The load on the upper reach causes a section 53 thereof to hang in a pendent fashion between the inner extremities of the troughing rollers 47. The load shown in Fig. 4 upon the upper reach would in such instances create conditions of concentrated stress as at points 54 thereon, at which points the upper reach would commence to be unsupported and heavily loaded. Such points of concentrated stress have the effect of greatly shortening the life of the conveyor belt, particularly in cases where steel belting is employed. To obviate such a condition of concentrated stress when the belt is thus loaded a support roller 56 is provided to support the central portion of the belt when loaded as described, so as to relieve such points of concentrated stress.

As seen more particularly in Figs. 4 and 5, the support roller 56 is formed so as to have a longitudinal cross section with an arcuate surface substantially matching the contour of the upper reach when so loaded. The support roller 56 turns on a shaft 57, the ends of which are held in slots 58 disposed at the end of support arms 59. Web members 61 maintain the arms 59 in properly spaced relationship. The arms 59 are anchored at their other ends to abutments 62, and are arranged to pivot with respect thereto on about cotter pins 63 passing through each abutment 62, the arms 59 and the cotter pins 63 being held in position against the anchors 62 by cotter keys 64.

The arms 59 together with the load supporting roller 56 are urged in a clockwise direction as seen in Fig. 5, so that the roller 56 is urged against the underside of the upper reach when loaded as seen in Fig. 4 by means of a coiled spring 66 located on a boss 67 and a boss 68 on the underside of the support arms 59. The movement in a clockwise direction by the spring 66 when the belt is in the unloaded condition as seen in Fig. 3 is limited by a stop 69 at the end of the arm 59 remote from the roller 56.

As seen in Fig. 5, the support roller 56 is located out of the plane containing the troughing rollers 47 so that said troughing rollers may freely swivel about the stub shafts 38 in accordance with the loading of the belt. The support roller is preferably located as close to the troughing rollers 47 as possible consistent with the free troughing movement thereof, and close enough to relieve the concentrated stress at points 54 when the belt is heavily loaded.

Alternately, the support roller 56 may be mounted on an arm or support which is fixed in position, and so disposed with reference to the centrally loaded portion 53 of the upper reach that the concentrated stress at the points 54 may be relieved as previously described.

From the foregoing description it will be evident that the improved troughing roller assembly according to the present invention presents many advantages. For example, when the belt is lightly loaded the troughing rollers will maintain the belt in the flattest condition possible consistent with transporting material therealong, so as to eliminate the presence of a deep trough in the belt and a deeply hanging central portion thereof, which as has been described tends to create the condition of concentrated stress.

The construction whereby the center of gravity of the troughing rollers and their support cages are disposed with reference to the axis of swiveling movement thereof in such a fashion as to apply a corrective moment to maintain the belt in the flattest troughing condition permitted, greatly eliminates the presence of such concentrated stress. Under conditions where the belt is heavily loaded and the troughing rollers are no longer able to apply the corrective moment to the belt to maintain the flat troughing condition described, the support roller comes into operation to eliminate the concentrated stress at the central pendent portion of the belt, thereby greatly increasing the life thereof.

While the invention has been described in terms of a preferred embodiment thereof it is intended that the scope thereof not be limited by such embodiment, nor otherwise than by the spirit and breadth of the claims here appended.

I claim:

1. A troughing roller assembly for the load carrying reach of an endless belt conveyor comprising a pair of troughing rollers disposed on each side of the centerline of said belt and having their axes substantially normal to said centerline, a cage for supporting each of said rollers for tilting movement in accordance with the loading of said belt, each of said troughing rollers and its associated cage being arranged so that their center of gravity lies outside of the axis of tilting movement of said cage so as to apply a correcting moment to maintain said belt as a shallow trough when in the light load and no load condition thereof to minimize the stress in said belt at points adjacent the inner ends of said troughing rollers, and a load supporting roller for said belt when portions thereof are hanging pendently between said troughing rollers by the load on said belt, said load supporting roller having a contour substantially matching such pendent portion of said belt and being arranged to contact the underside of said belt to relieve the concentrated stresses in said belt along the inner ends of said troughing rollers when the belt is so loaded, said load supporting roller being disposed out of the plane containing said troughing rollers.

2. A troughing roller assembly for the load carrying reach of an endless belt conveyor comprising a pair of troughing rollers disposed on each side of the centerline of said belt and having their axes substantially normal to said centerline, means for supporting said rollers for tilting movement in accordance with the loading of said belt, each of said troughing rollers and its supporting means being arranged so that their center of gravity lies outside of the axis of tilting movement thereof to apply a correcting moment to maintain said belt as a shallow trough when in the light load and no load condition thereof to minimize the stress in said belt at points adjacent the inner ends of said troughing rollers, and a load supporting roller for said belt when portions thereof are hanging pendently between said troughing rollers by the load on said belt, said load supporting roller having a contour substantially matching such pendent portion of said belt and being arranged to contact the underside of said belt to relieve the concentrated stresses in said belt along the inner ends of said troughing rollers when the belt is so loaded.

3. A troughing roller assembly for the load carrying reach of an endless belt conveyor comprising a pair of troughing rollers disposed on each side of the centerline of said belt and having their axes substantially normal to said centerline, means for supporting said rollers for tilting movement in accordance with the loading of said belt, a load supporting roller for said belt when portions thereof are hanging pendently between said troughing rollers by the load on said belt, said load supporting roller being mounted independently of said troughing rollers and having a contour substantially matching such pendent portion of said belt and being arranged to contact the underside of said belt to relieve the concentrated stresses in said belt along the inner ends of said troughing rollers when the belt is so loaded, and means for enabling said load supporting roller to move in a vertical direction in accordance with the load condition of such pendent portion.

4. A troughing roller assembly for the load carrying reach of an endless belt conveyor comprising a pair of troughing rollers disposed on each side of the centerline of said belt and having their axes substantially normal to said centerline, means for supporting said rollers for tilting movement in accordance with the loading of said belt, a load supporting roller for said belt when portions thereof are hanging pendently between said troughing rollers by the load on said belt, said load supporting roller being mounted independently of said troughing rollers and having a contour substantially matching such pendent portion of said belt and being arranged to contact the underside of said belt to relieve the concentrated stresses in said belt along the inner ends of said troughing rollers when the belt is so loaded, a pivotable arm for mounting said load supporting roller, and resilient means urging said load supporting roller into contact with the pendent portion of said belt.

5. A troughing roller assembly for the load carrying reach of an endless belt conveyor comprising a pair of troughing rollers disposed on each side of the centerline of said belt and having their axes substantially normal to said centerline, means for supporting said rollers for tilting movement in accordance with the loading of said belt, and a load supporting roller for said belt when portions thereof are hanging pendently between said troughing rollers by the load on said belt, said load supporting roller being mounted independently of said troughing rollers and having a contour substantially matching such pendent portion of said belt and being arranged to contact the underside of said belt to relieve the concentrated stresses in said belt along the inner ends of said troughing rollers when the belt is so loaded.

6. A troughing roller assembly for the load carrying reach of an endless belt conveyor comprising a pair of troughing rollers disposed on each side of the centerline of said belt and having their axes substantially normal to said centerline, a cage for supporting each of said rollers for tilting movement in accordance with the loading of said belt, each of said troughing rollers and its associated cage being arranged so that their center of gravity lies outside of the axis of tilting movement of said cage so as to apply a correcting moment to maintain said belt as a shallow trough when in the light load and no load condition thereof to minimize the stress in said belt at points adjacent the inner ends of said troughing rollers.

References Cited in the file of this patent

UNITED STATES PATENTS

| Number | Name | Date |
|---|---|---|
| 909,833 | Vrooman | Jan. 12, 1902 |